United States Patent
Simons et al.

(10) Patent No.: US 10,487,979 B2
(45) Date of Patent: Nov. 26, 2019

(54) T-POST HANGER PLATE

(71) Applicant: CM Fabricating, LLC, Kansas City, MO (US)

(72) Inventors: Nicholaus Scott Simons, Kansas City, MO (US); Christopher John McFarland, Liberty, MO (US)

(73) Assignee: CM Fabricating, LLC, Kansas City, MO (US)

( * ) Notice: Subject to any disclaimer, the term of this patent is extended or adjusted under 35 U.S.C. 154(b) by 0 days.

(21) Appl. No.: 15/867,341

(22) Filed: Jan. 10, 2018

(65) Prior Publication Data

US 2018/0195663 A1 Jul. 12, 2018

Related U.S. Application Data

(60) Provisional application No. 62/445,122, filed on Jan. 11, 2017.

(51) Int. Cl.

| *F41J 1/10* | (2006.01) |
| *F16M 13/02* | (2006.01) |
| *E04H 12/00* | (2006.01) |
| *E04H 17/24* | (2006.01) |

(52) U.S. Cl.
CPC .............. *F16M 13/02* (2013.01); *E04H 12/00* (2013.01); *E04H 17/24* (2013.01); *F41J 1/10* (2013.01)

(58) Field of Classification Search
CPC ...... F41J 1/10; F41J 7/00; F16B 2/246; E04H 2017/1473; E04H 12/22; E04H 12/2253; E04H 12/2269; E04H 17/20; E04H 17/24; E04H 12/00; A47G 7/044; A47F 5/0006; A47B 96/061; F16M 13/02
USPC ........ 248/87, 156, 219.1, 219.3, 219.4, 304, 248/692, 301; 273/407; 473/454, 456, 473/446
See application file for complete search history.

(56) References Cited

U.S. PATENT DOCUMENTS

| 1,666,293 | A | * | 4/1928 | Lorton | .................... A47J 33/00 108/30 |
| 1,668,233 | A | * | 5/1928 | De Remer | .............. E04H 17/24 248/297.31 |
| 3,762,687 | A | * | 10/1973 | De Rome | ................. B66C 1/62 254/30 |
| 4,309,120 | A | * | 1/1982 | Werthmann | ............ F16B 2/246 16/DIG. 25 |
| 4,908,982 | A | * | 3/1990 | Quatrini | ................. A47G 7/042 248/297.51 |

(Continued)

*Primary Examiner* — Ingrid M Weinhold
(74) *Attorney, Agent, or Firm* — Spencer Fane LLP

(57) ABSTRACT

A T-post hanger plate for mounting to a T-post forms an opening passing through the plate. The opening is shaped to allow the T-post to pass through the opening when the plate is orientated perpendicular to the T-post, and the opening engages the protrusions on the flange of the T-post when the T-post hanger plate is angled relative to the T-post. A hook at an end of the T-post hanger plate allows a target to be hung from the hanger plate when it is mounted to a T-post. The hook has a smooth inner surface and an angular outer surface. Striking the target causes the target to pivot on the hook, but the angular outer surface causes the target to bind on the hook preventing the target from swinging off of the hook due to the movement created by striking the target with a projectile, such as a bullet.

7 Claims, 20 Drawing Sheets

(56) References Cited

U.S. PATENT DOCUMENTS

| | | | | |
|---|---|---|---|---|
| 5,009,394 A * | 4/1991 | Marshall | ............... | B66F 3/36 |
| | | | | 254/30 |
| 5,035,384 A * | 7/1991 | Werthmann | ......... | E01C 19/008 |
| | | | | 24/339 |
| 5,435,097 A * | 7/1995 | Harper | ............... | A01G 17/04 |
| | | | | 248/156 |
| 5,482,237 A * | 1/1996 | Wang | ............... | A47B 57/26 |
| | | | | 248/125.1 |
| D405,682 S * | 2/1999 | Suher | ............... | D8/370 |
| 6,247,553 B1 * | 6/2001 | Jones | ............... | E06C 9/04 |
| | | | | 182/92 |
| 6,394,228 B1 * | 5/2002 | Stephens | ............ | E06C 1/381 |
| | | | | 182/119 |
| D523,907 S * | 6/2006 | Law | ............... | D21/302 |
| 7,988,155 B2 * | 8/2011 | Wyrick | ............ | F41J 7/00 |
| | | | | 273/407 |
| 8,959,782 B1 * | 2/2015 | Schaefer | ............ | F41G 1/467 |
| | | | | 124/87 |
| 2006/0124817 A1 * | 6/2006 | White | ............... | A47G 7/044 |
| | | | | 248/339 |
| 2010/0225063 A1 * | 9/2010 | Wyrick | ............ | F41J 1/10 |
| | | | | 273/390 |
| 2015/0268013 A1 * | 9/2015 | Heise | ............ | F41J 7/04 |
| | | | | 273/389 |
| 2015/0300558 A1 * | 10/2015 | Bishop | ............ | F16M 13/02 |
| | | | | 324/511 |
| 2016/0317849 A1 * | 11/2016 | Cowell | ............ | A62B 35/0068 |
| 2017/0135505 A1 * | 5/2017 | Belt | ............... | A47G 7/045 |
| 2017/0343324 A1 * | 11/2017 | Fernandez | ......... | F41J 7/00 |
| 2018/0058827 A1 * | 3/2018 | Urban | ............ | F41J 1/10 |

* cited by examiner

US 10,487,979 B2

T-POST HANGER PLATE

BACKGROUND

1. Field of the Disclosed Subject Matter

The present disclosed subject matter relates to post-mounted plates, and in particular, T-post hanger plates for use with shooting targets.

2. Background

Traditional T-post hanger plates used with shooting targets sit on top of a T-post like a cap, or slide up and down a T-post utilizing bolts and pins to lock the plate in place at a location on the T-post. T-post hanger plates that sit on the top of T-posts are not very sturdy or versatile, and only allow targets or items to be hung solely at the top portion of the T-post. Traditional T-post hanger plates that slide up and down on T-posts are large and require tools to secure the plate into place on a T-post using bolts and pins, and have to be placed onto a T-post in a single orientation to enable the bolt and pin to lock into place. What is needed is a simple, versatile, and multi-directional T-post hanger plate that can be positioned on a T-post by sliding up and down and be secured in place easily, without the need for tools.

SUMMARY

In its embodiments, the present disclosed subject matter contemplates a multi-directional T-post hanger plate that attaches to a T-post without fasteners or tools. In an embodiment, the T-post hanger plate is manufactured from a resilient material, with a T-shaped hole formed in the plate allowing a T-post to pass through. The T-shaped hole is dimensioned to allow the plate to lock into place at any height along a T-post. A hanging mechanism at the ends of the plate allow shooting targets or other items, such as animal feed, to be hung from the T-post hanger plate. In other embodiments, the hanging mechanisms could be hooks, pegs, pulleys, links, etc. The T-post hanger plate can be placed on top of a T-post with the hooks facing upwards or downwards and can lock or latch into place regardless of whether the hooks face up or down, and shooting targets, animal feed, or the like can be hung from the hooks.

The present disclosed subject matter further contemplates the T-post hanger plate having various shapes, including octagonal, square, oval, rectangle, etc.

The present disclosed subject matter further contemplates the T-post hanger plate with various forms of hanging mechanisms, multiple hanging mechanisms on each end, or removable hanging mechanisms.

The present disclosed subject matter further contemplates the T-post hanger plate made out of various materials, including steel, such as AR500 steel.

The present disclosed subject matter further contemplates the T-shaped hole in the T-post hanger plate to be shaped as "a lower case t" with two intersecting perpendicular lines formed in the plate.

The present disclosed subject matter further contemplates the T-post hanger plate with various shapes and sizes of holes formed in the plate, with the same locking capabilities as the T-shaped hole originally described.

BRIEF DESCRIPTION OF THE DRAWINGS

The present disclosed subject matter is described herein with reference to the following drawing figures, with greater emphasis being placed on clarity rather than scale.

DETAILED DESCRIPTION

Figure 1:
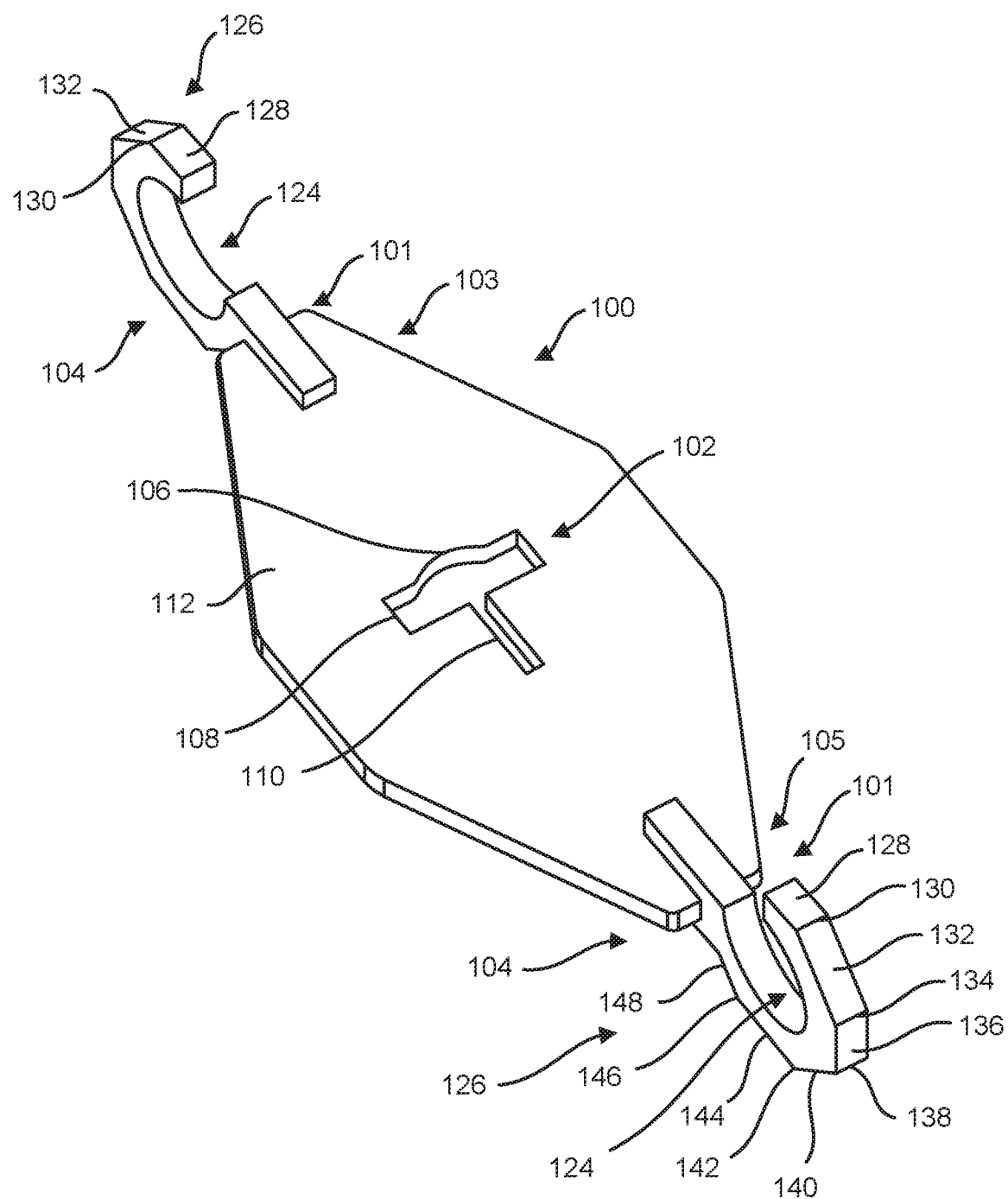
FIG. 1 is a perspective view from above of one face of a long-octagon shaped T-post hanger plate with a T-shaped hole formed in the plate and a hanging member or hook formed at opposite ends of the long octagon-shaped plate.
Figure 2:
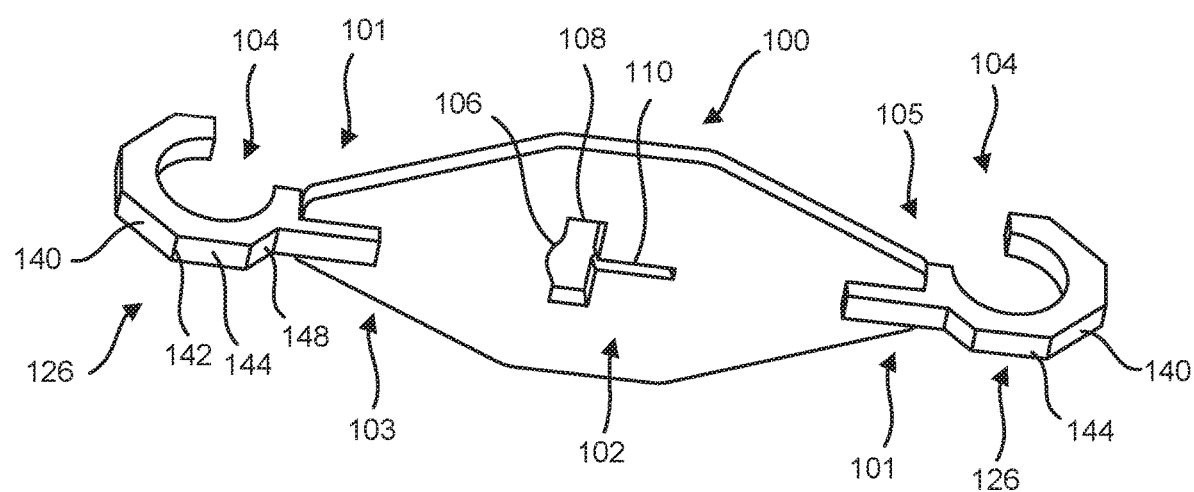
FIG. 2 is a perspective view from below of the T-post hanger plate of FIG. 1.
Figure 3:
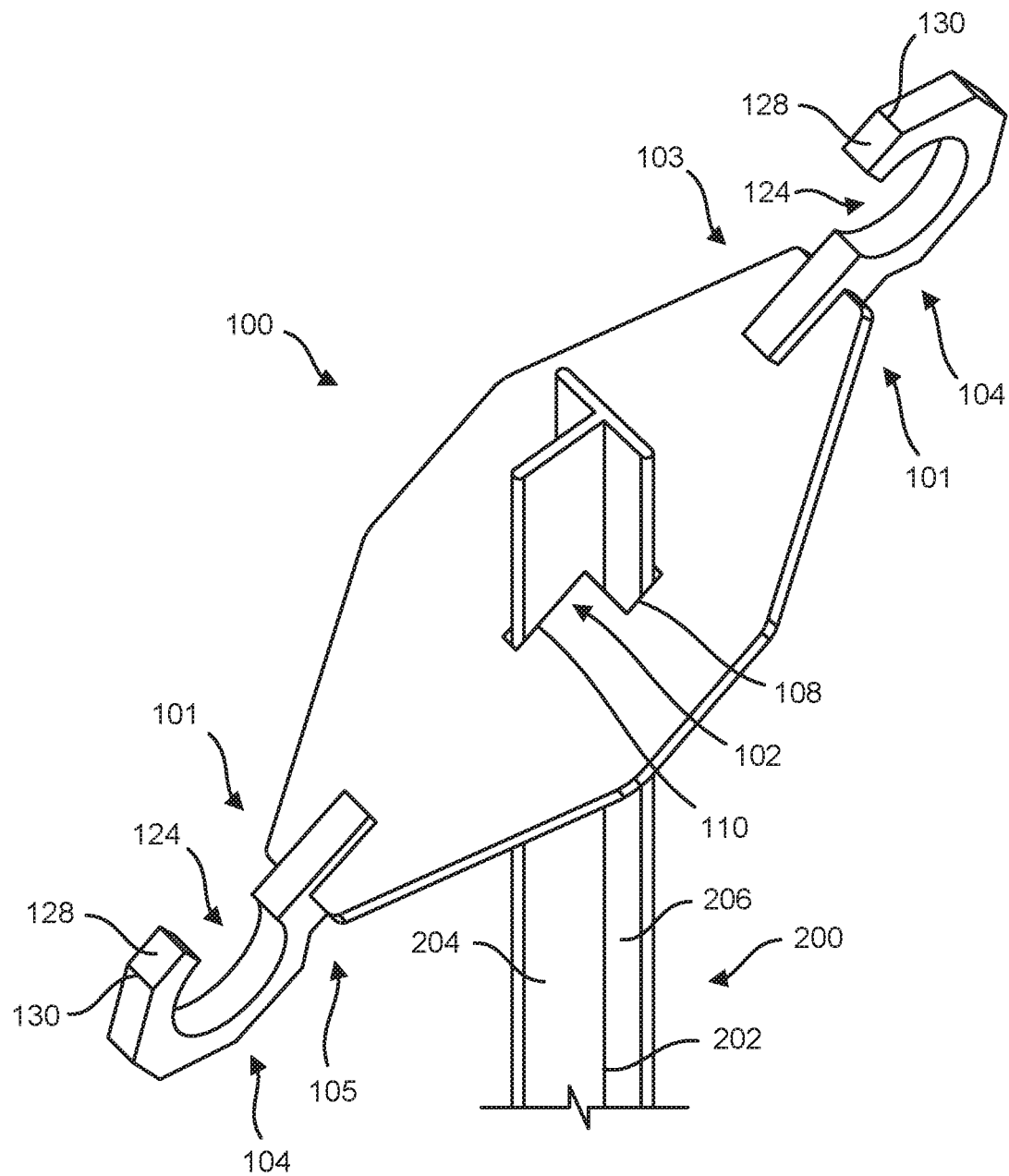
FIG. 3 is a perspective view from above of the T-post hanger plate of FIG. 1 mounted to a T-post.

The disclosed subject matter pertains to a T-post hanger plate 100 having a body 112 extending between a first end 103 to a second end 105, the body 112 forming a T-shaped opening or mounting hole 102, with the mounting hole 102 formed from a first elongated aperture 108 intersecting a second elongated aperture 110. The second elongated aperture 110 is orientated to extend between the first end 103 and second end 105, and the first elongated aperture 108 is disposed at and intersects the end of the second elongated aperture 110 adjacent the first end 103. The T-post hanger plate 100 is mounted to a T-post 200. A T-post 200 has an elongated body 202 forming a web 204 that intersects an outwardly extending flange 206 such that the body 202 has a T-shaped cross-sectional shape. T-posts 200 are generally driven into the ground to use as fencing materials. Studs or protrusions 301 extend from the flange 206 to allow the fastening of fencing material, such as wire or barbed wire. The first elongated aperture 108 is dimensioned to accept the flange 206, and the second elongated aperture 110 is dimensioned to accept the web 204. The first elongated aperture 108 forms a C-curve or notch 106 adjacent the intersection of the first elongated aperture 108 and second elongated aperture 110. The notch 106 extends toward the body 112 first end 103, and is dimensioned to allow the studs or protrusions 301 on the flange 206 to pass through the notch 106 when the body 112 is within the mounting hole 102 and the mounting hole 102 is in a plane perpendicular to the body 202. Orientating the mounting hole 102 out of perpendicular alignment with the body 202 moves the notch 106 closer to the flange 206 preventing passage of the protrusions 302 through the notch 106, thereby preventing movement of the body 112 along the T-post 200. In an embodiment, the body 112 is manufactured from a resilient material, such as metal, including AR500 steel.

Referring to FIGS. 1-7, an embodiment of a body 112 forming a mounting hole 102 is disclosed forming a flat long-octagon shaped T-post hanger plate 100. A hanging member 104, such as a hook, is formed from at each of the two shorter sides 101, namely the first end 103 and second end 105 of the long-octagon shaped body 112. The hanging member 104 is formed from the body 112, or is formed separately and connected to the body 112. In an embodiment, the hanging member 104 is manufactured from metal, such as AR500 steel, and welded to the body 112.

An embodiment of the hanging member 104 is generally C-shaped forming a smooth inner surface 124 and an outer surface 126 forming a plurality of facets. The hanging member 104 is dimensioned to pass through a rectangular hole 352 in an object or a target 350 hung from the hanging member 104. In an embodiment, the outer surface 126 forms a plurality of facets intersecting at junctions. A first cross-sectional dimension extends between the inner surface 124 and the outer surface 126 located at a midpoint between each junction, a second cross-sectional dimension extends between the inner surface 124 and the outer surface 126 located at each junction, and the second cross-sectional dimension is generally greater than the first cross-section dimension. The second cross-sectional dimension is dimensioned to pass through the hole 352 when the plane of the hole 352 is aligned with the second cross-section. In an embodiment, the facets are planar, and the junctions form angles. In an embodiment, outer surface 126 is curvilinear with the facets forming valleys and the junctions forming peaks. In an embodiment, a first facet 128 intersects a second facet 132 at a first junction 130, the second facet 132 intersects a third facet 136 at a second junction 134, the third facet 136 intersects a fourth facet 140 at a third junction 138, the fourth facet 140 intersects a fifth facet 144 at a fourth junction 142, and the fifth facet 144 intersects a sixth fact 148 at a fifth junction 146. Referring to FIGS. 1-4, a hanging member 104 with planar facets and angular junctions is shown.

Figure 19:
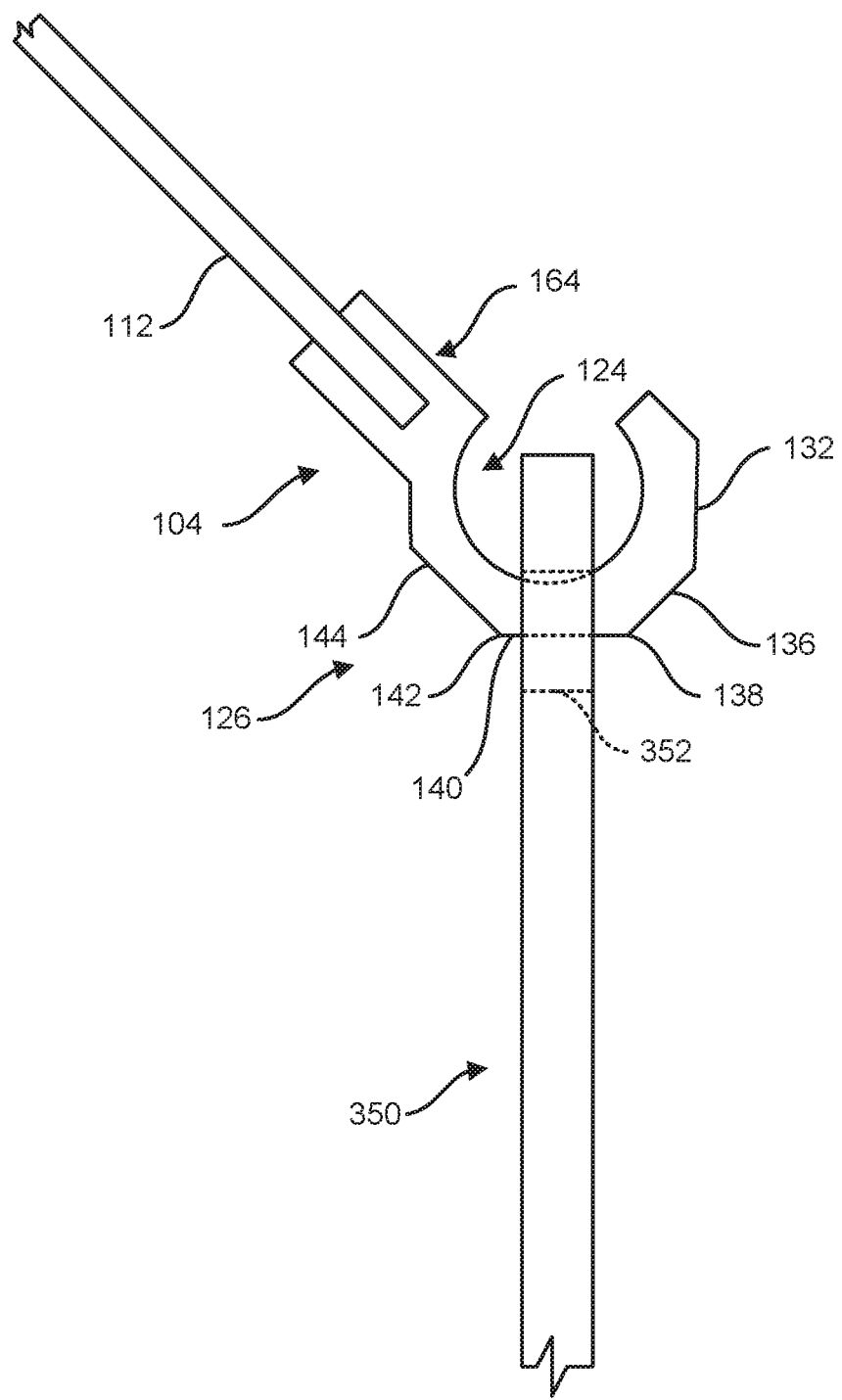
FIG. 19 is a side elevation view of a target mounted to the hanging member.
Figure 20:
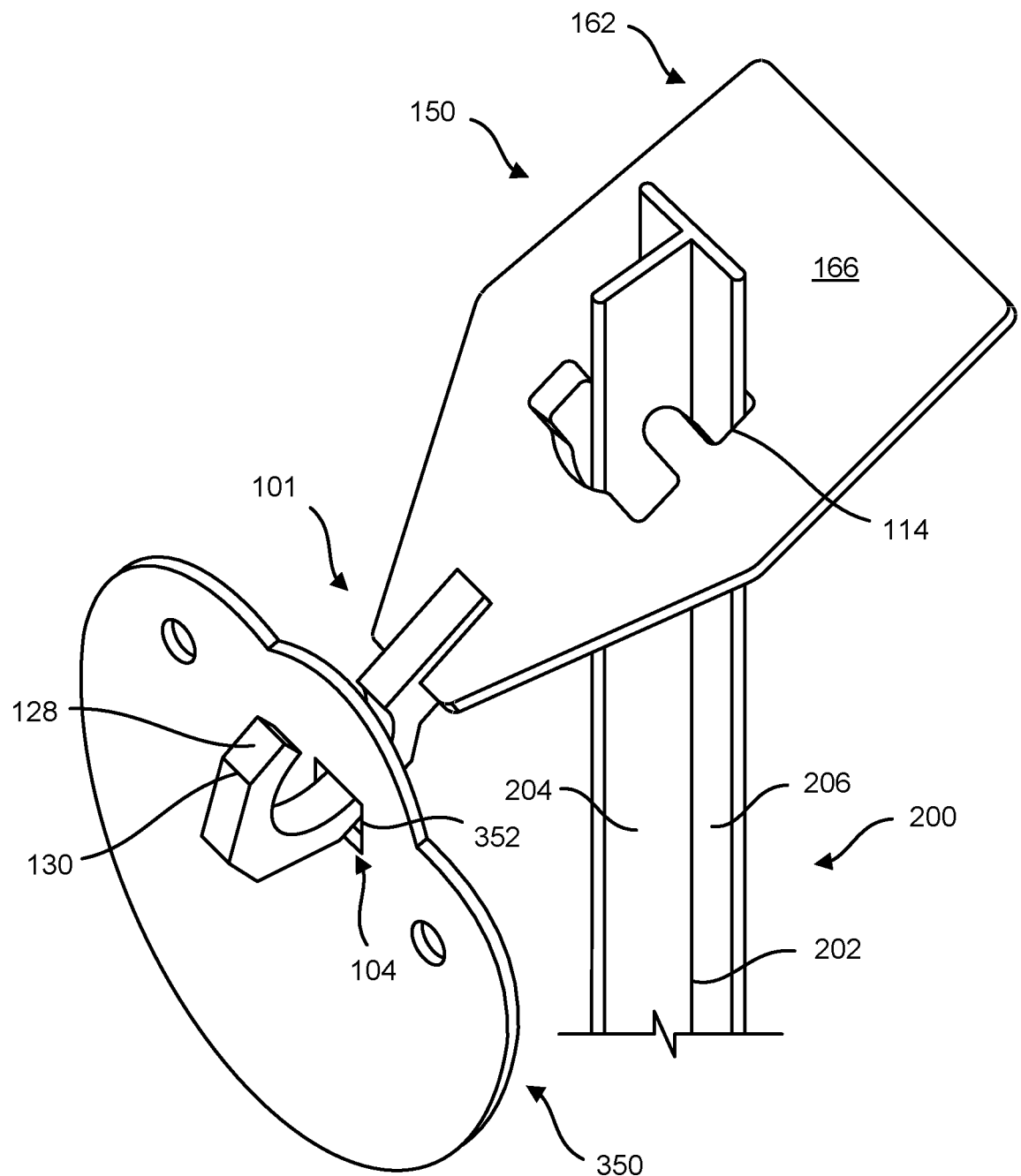
FIG. 20 is a perspective view from above of the T-post hanger plate of FIG. 14, and a target mounted to the hanging member.

The planar facets and angular junctions prevent the target 350 from being disengaged from the hanging member 104 when it is struck by a bullet while being used as a shooting target. The target 350 typically hangs from the hanger plate 100 perpendicular to the ground. Pitching of the bottom of the target 350 toward or away from the T-post 200 causes the top and bottom edges of the hole 352 to bite into the inner surface 124 and outer surface 126 of the hanging member 104. The kinetic energy of a bullet striking the target 350 will move the target 350 on the hanging member 104 toward the T-post 200, causing the hole 352 to bias against the hanging member 104, and the resulting rebound of the target 350 away from the T-post 200 tends to move the target 350 on the hanging member 104 forcing the target 350 off of the hanging member 104. But, the misalignment of the hole 352 with an adjacent junction of the hanging member 104 prevents the hole 352 from passing over the junction thereby preventing the target 350 from flying off of the hanger plate 100 after being struck by a bullet. FIGS. 19-20 show the target 350 mounted to an embodiment of a hanger plate 150, discussed below.

Figure 4:
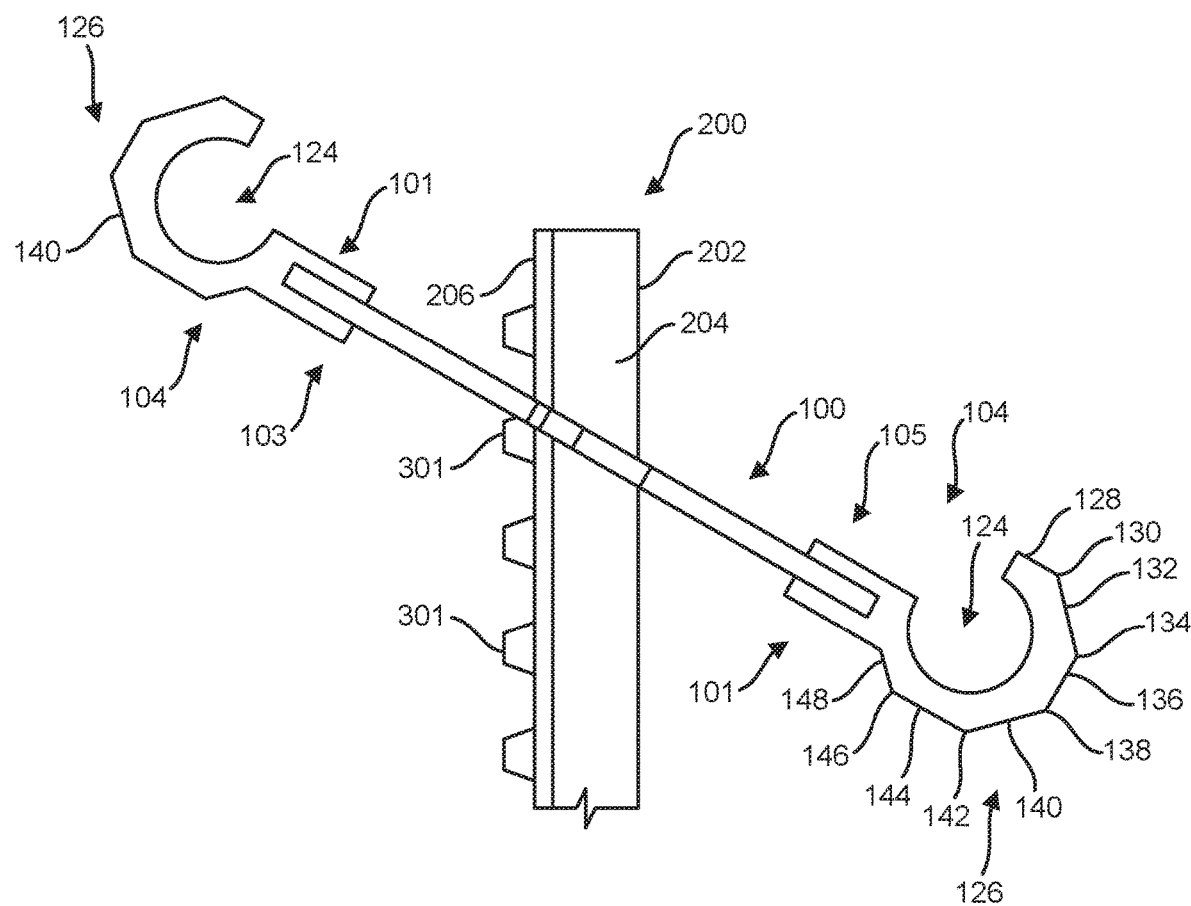
FIG. 4 is an elevation view of the T-post hanger plate of FIG. 3 mounted on a T-post, and engaging a protrusion.
Figure 5:
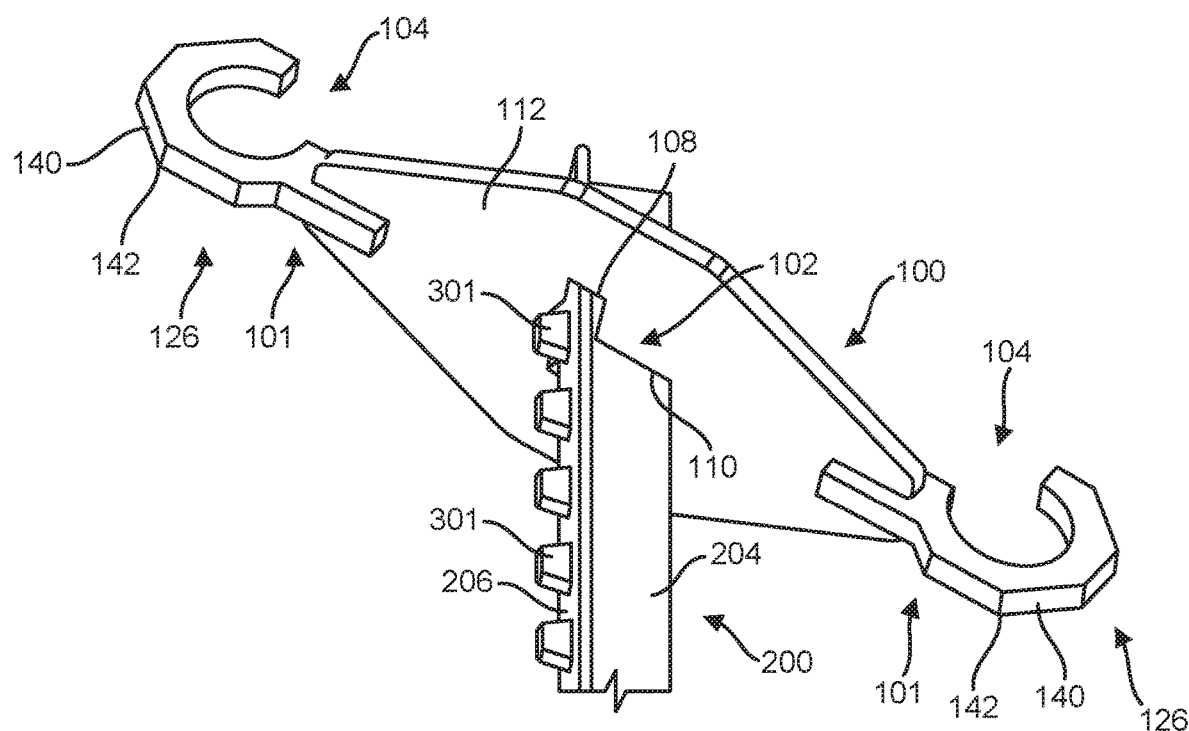
FIG. 5 is a perspective view from below of the T-post hanger plate of FIG. 3 showing the protrusions that run down the back of a T-post, and a depiction of how a T-post hanger plate engages the protrusions, securing the T-post hanger plate in place.
Figure 6:
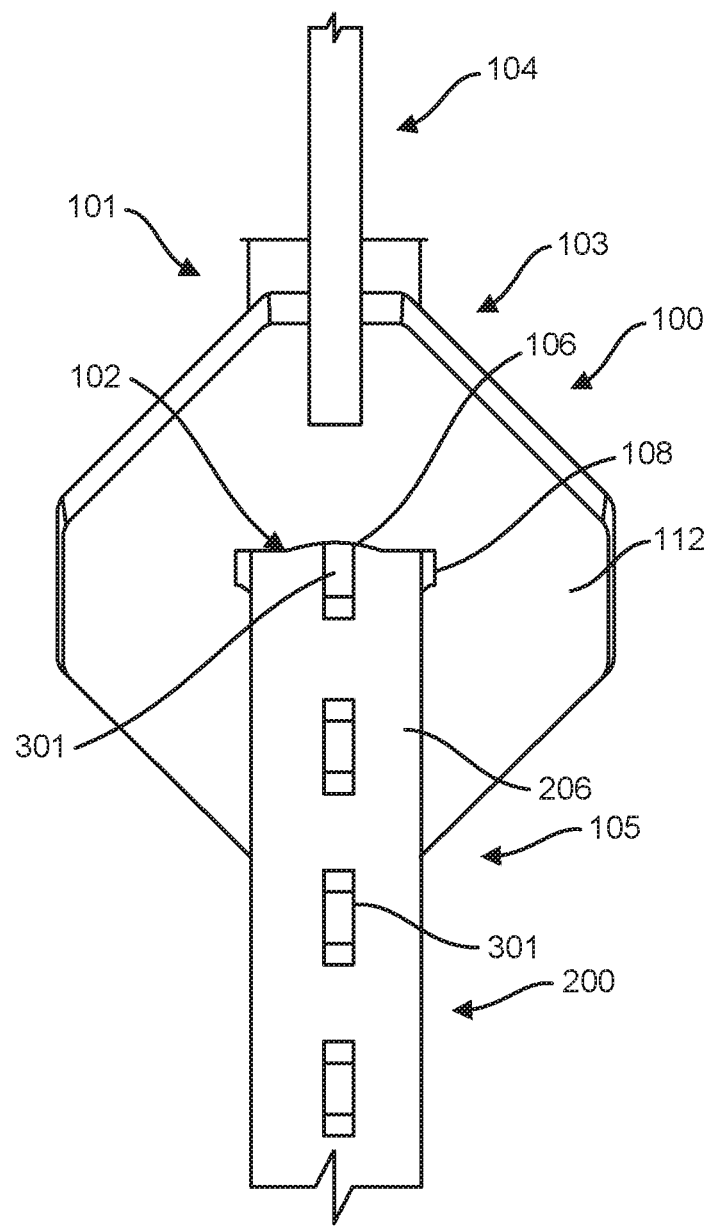
FIG. 6 is a perspective view from below of the T-post hanger plate of FIG. 4 showing the protrusions that run down the back of a T-post and a depiction of how a T-post hanger plate engages the protrusions securing the T-post hanger plate in place.
Figure 7:
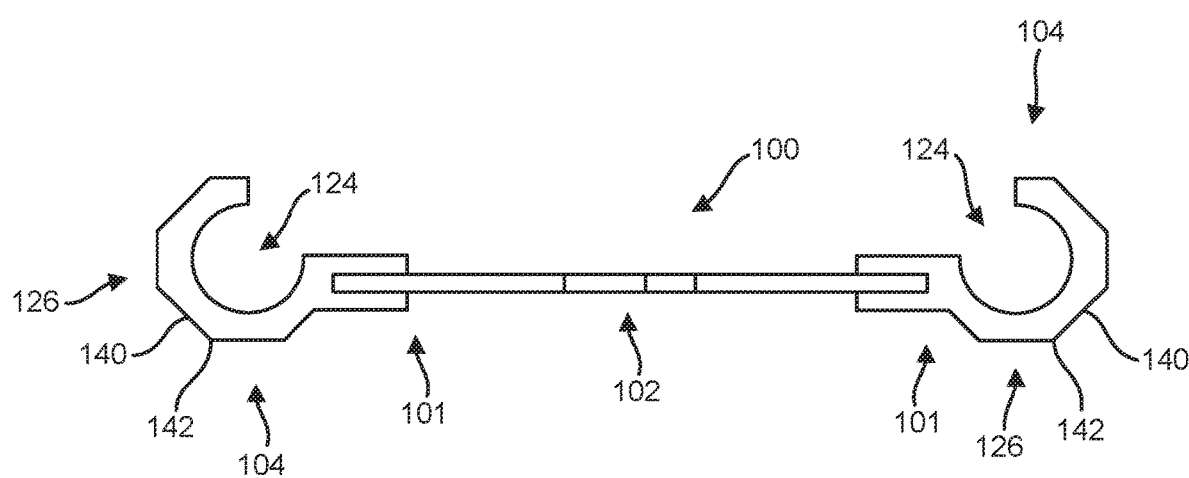
FIG. 7 is an elevation view of the T-post hanger of FIG. 1.

FIGS. 3-6 show the long-octagon shaped T-post hanger plate 100 placed on a T-post 200. Referring to FIG. 4, an elevation view of the long-octagon shaped T-post hanger plate 100 on a vertically orientated T-post 200 is shown. The flange 206 is shown passing through the first elongated aperture 108, the web 204 is shown passing through the second elongated aperture 110, and the body 112 first end 103 and second end 105 are not in a plane perpendicular to the body 202. When the first elongated aperture 108 is positioned between protrusions 301, orientating the second end 105 at a lower elevation than the first end 103, as shown in FIG. 4, moves the notch 106 closer to the flange 206, decreasing the distance between the notch 106 and flange 206 and preventing passage of the protrusions 301 through the notch 106. Accordingly, the T-post hanger plate 100 is held in place on the T-post 200 and prevented from moving down on the body 202 due to the protrusion 301 contacting the body 112, in particular, at the underside of the body 112. In turn, an item, such as a target 350 can be hung from the hanging member 104 at the second end 105. Optionally, when an item is hung from the second end 105, an item can be hung from the hanging member 104 at the first end 103.

Figure 8:
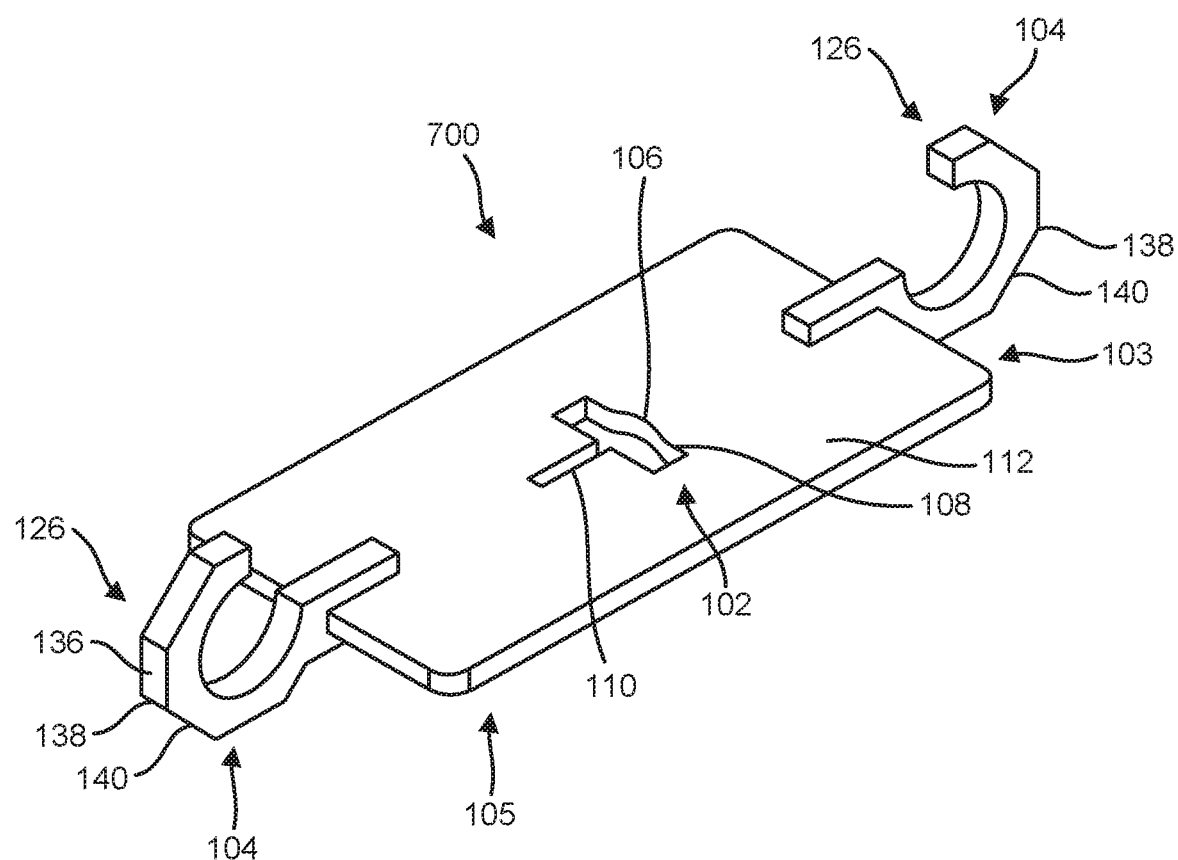
FIG. 8 is a perspective view from above of a rectangular T-post hanger plate with a T-shaped hole formed in the plate, and a hook affixed to opposite ends of the plate.
Figure 9:
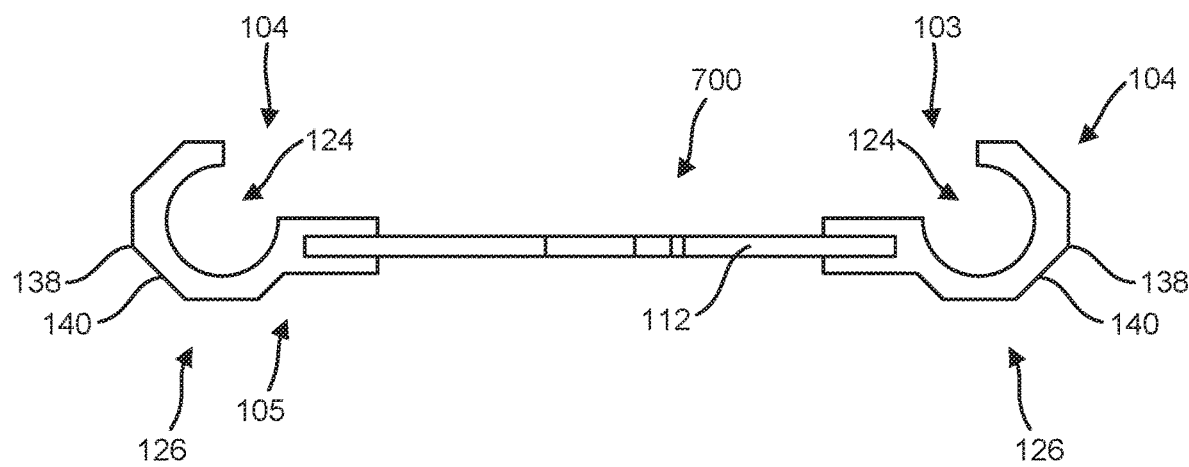
FIG. 9 is an elevation view of the T-post hanger plate of FIG. 8.
Figure 10:
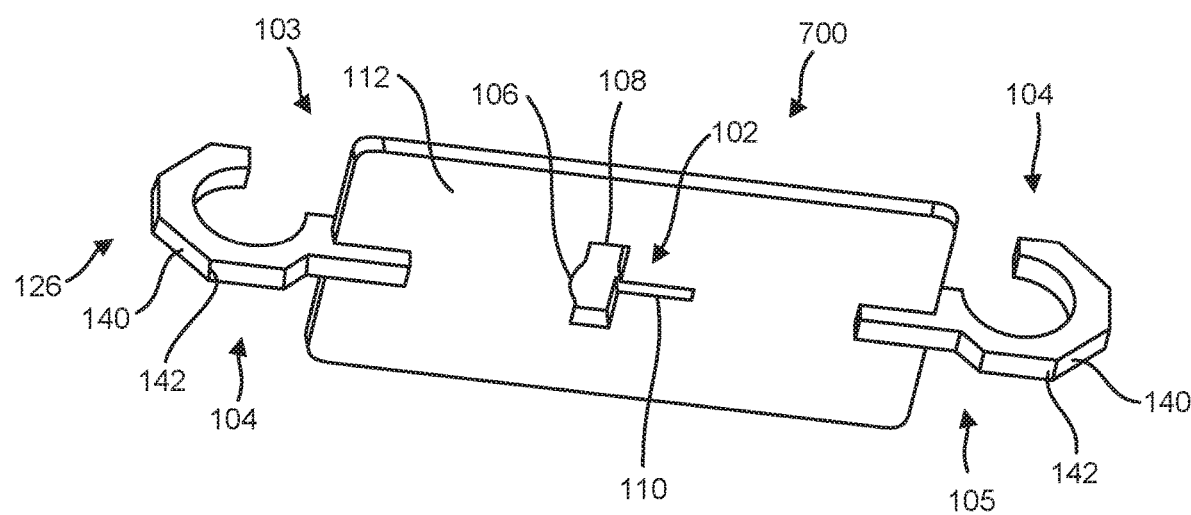
FIG. 10 is a perspective view from below of the T-post hanger plate of FIG. 8.

FIGS. 8-10 show an alternative embodiment T-post hanger plate 700 with a flat rectangular body 112, and the mounting hole 102 and hanging members 104 of T-post hanger plate 100.

Figure 11:
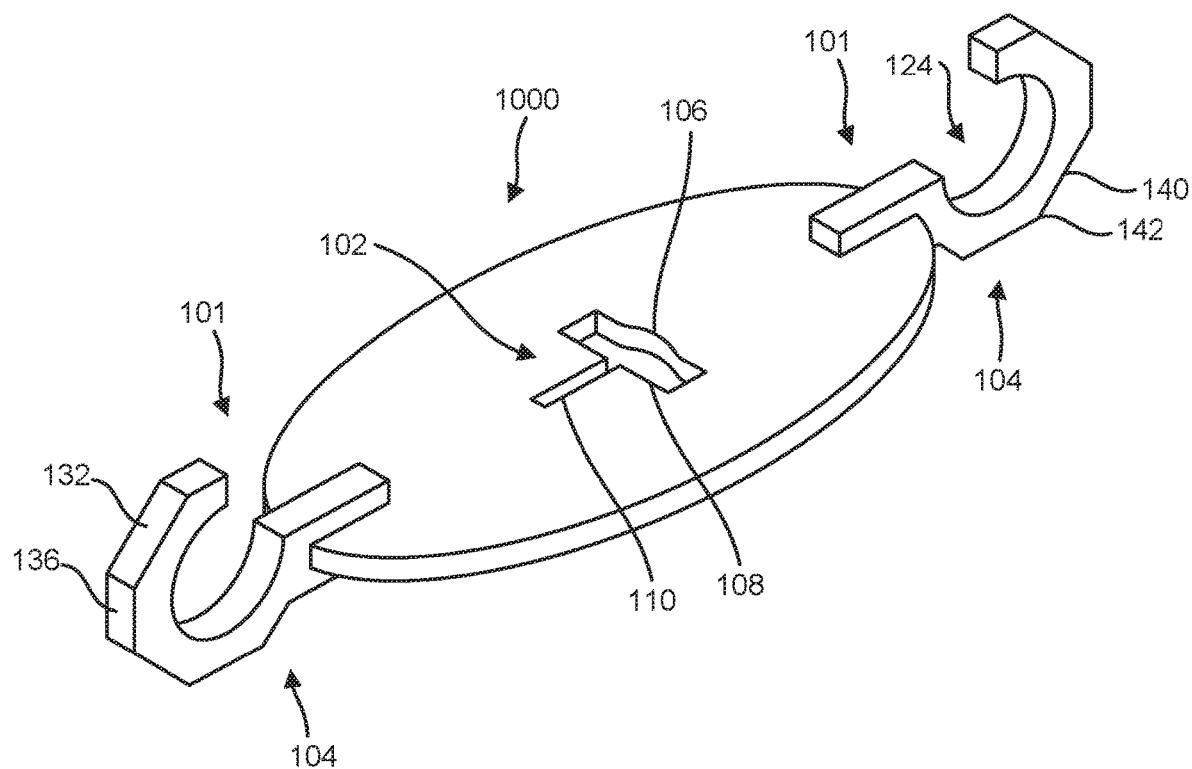
FIG. 11 is a perspective view from above of an oval T-post hanger plate with a T-shaped hole formed in the plate, and a hook formed at opposite ends of the plate.
Figure 12:
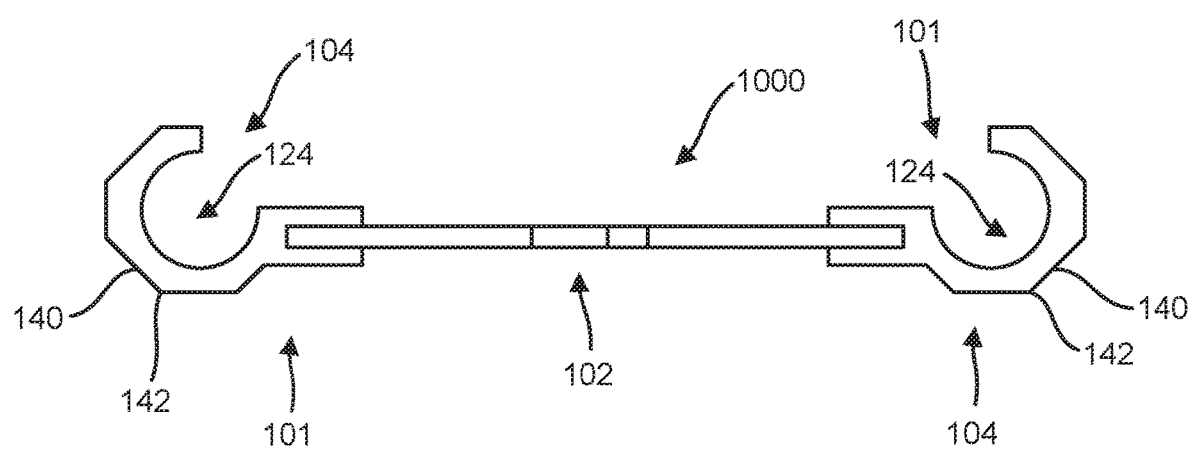
FIG. 12 is an elevation view of the T-post hanger plate of FIG. 11.
Figure 13:
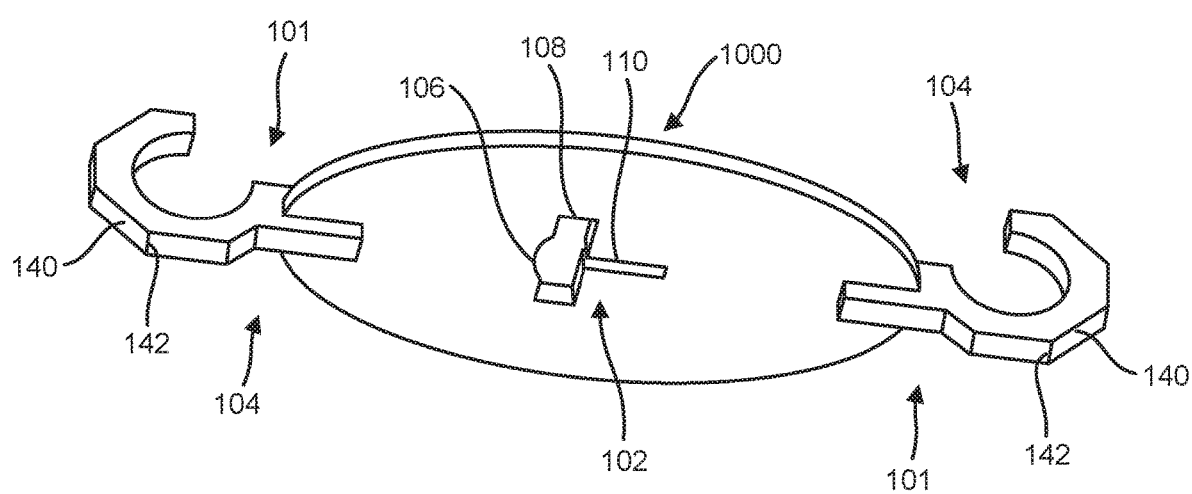
FIG. 13 is a perspective view from below of the T-post hanger plate of FIG. 11.
Figure 14:
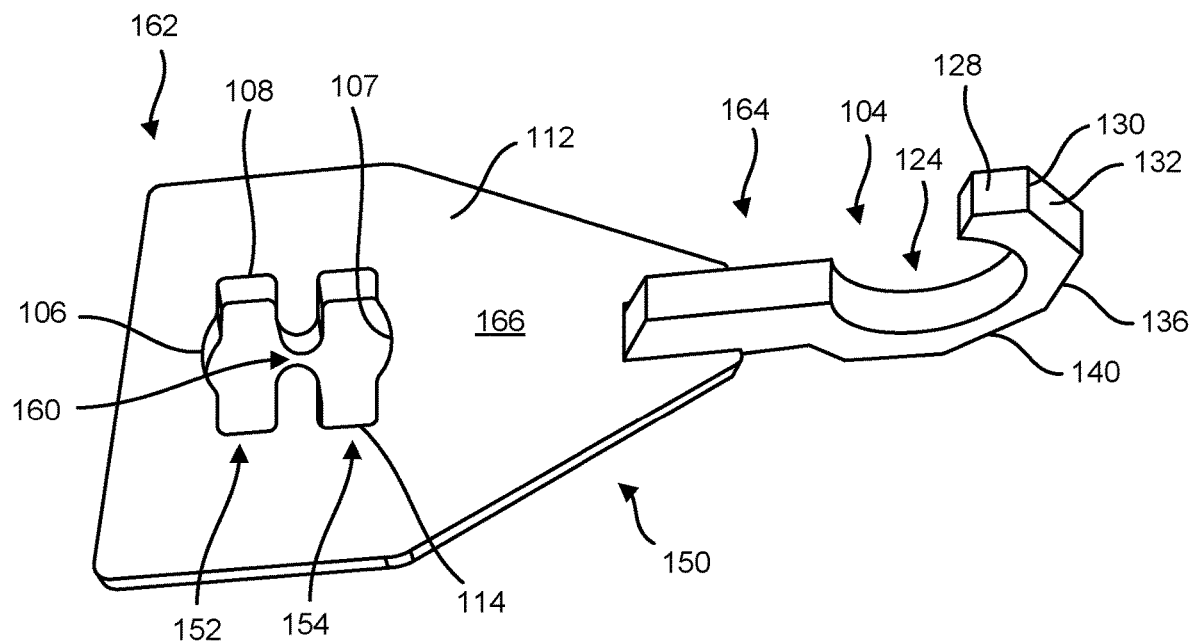
FIG. 14 is a perspective view from above of an alternative embodiment T-post hanger plate embodying aspects of the disclosed subject matter.
Figure 15:
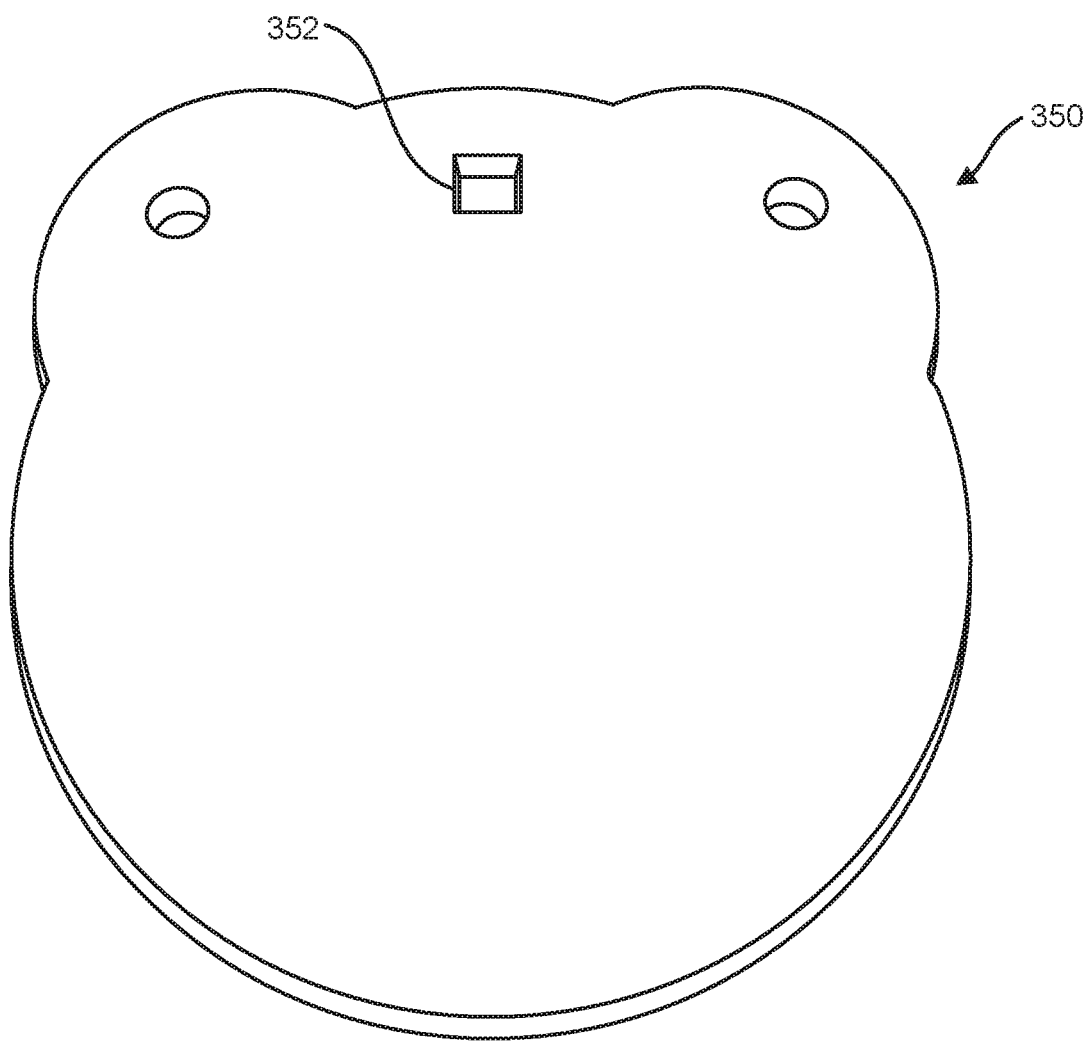
FIG. 15 is an elevation view of a target used with the various embodiments of T-post hanger plates shown and described.

FIGS. 11-13 show an alternative embodiment T-post hanger plate 1000 with a flat oval shaped body 112, and the mounting hole 102 and hanging members 104 of T-post hanger plate 100.

Referring to FIGS. 14-20, and alternative embodiment T-post hanger plate 150 is shown and described having a body 112 extending between a first end 162 and second end 164, and having top surface 166 and opposite bottom surface defining a thickness. The body 112 of the plate 150 has a first mounting hole 152 and second mounting hole 154 connected by a second aperture 160. The aperture 160 is formed by opposing tabs extending from the sides of the aperture 160. The first mounting hole 152 has a notch 106 adjacent a first end 162, and the second mounting hole 154 has a second notch 107 adjacent a second end 164. A hanging member 104 is connected to the second end 164.

Figure 16:
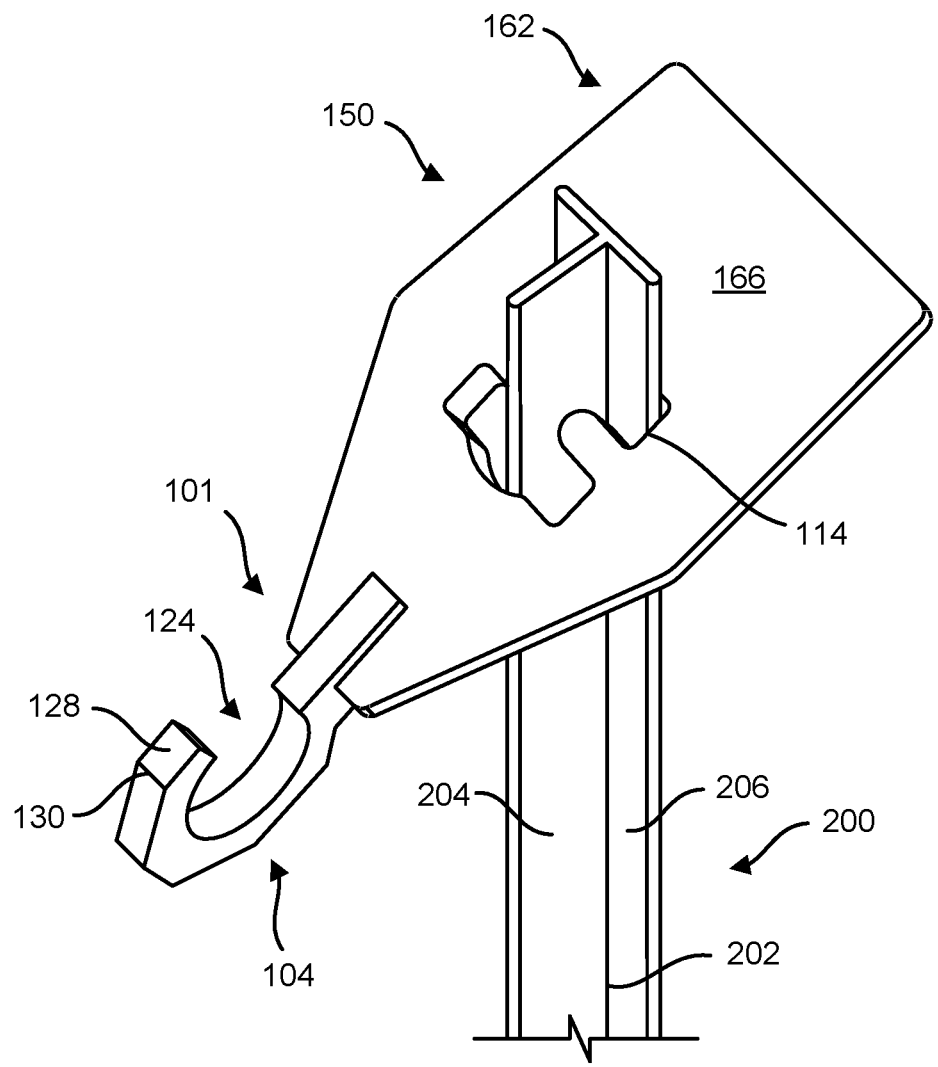
FIG. 16 is a perspective view from above of the T-post hanger plate of FIG. 14 mounted to a T-post.
Figure 17:
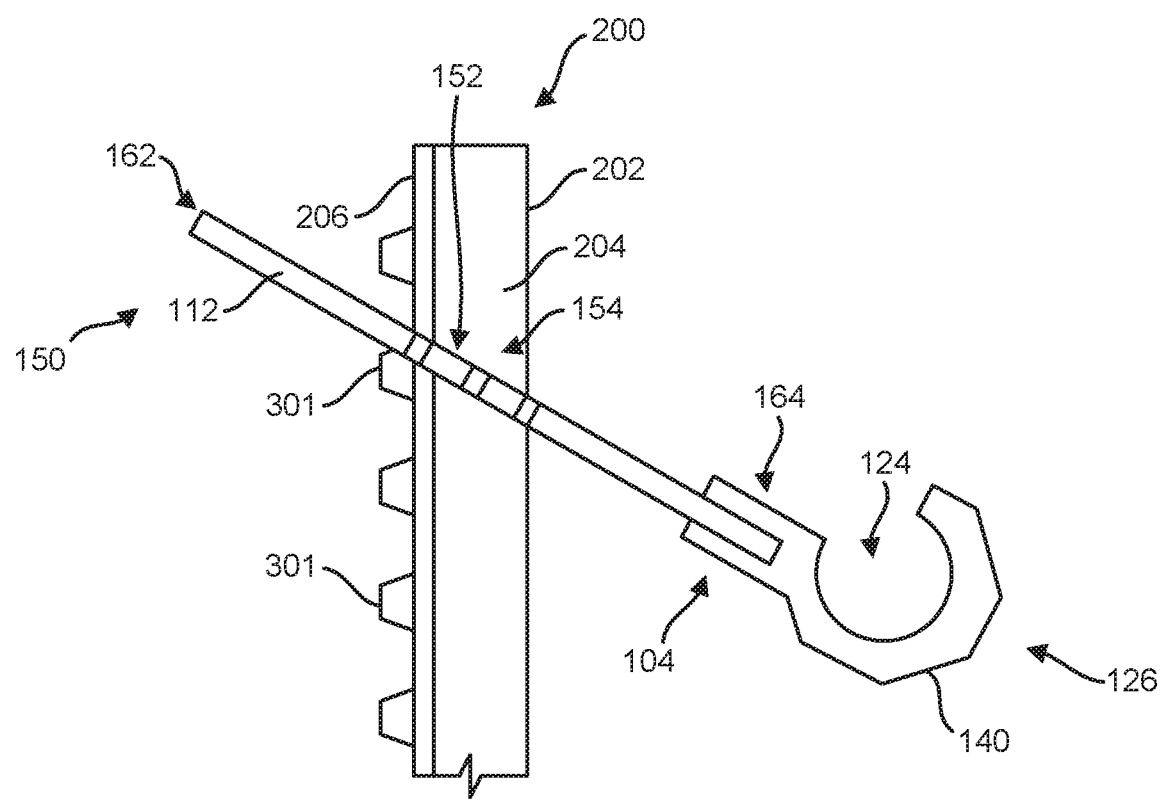
FIG. 17 is an elevation view of the T-post hanger plate of FIG. 14 mounted on a T-post, and engaging a protrusion.
Figure 18:
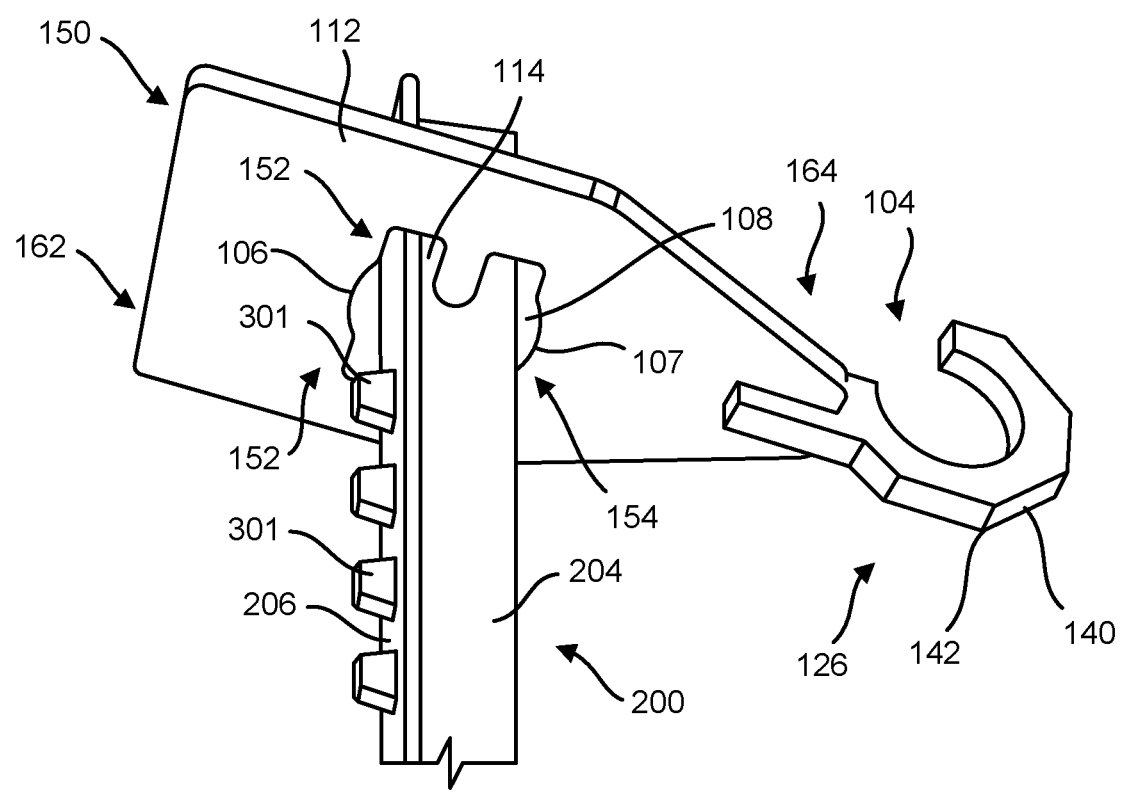
FIG. 18 is a perspective view from below of the T-post hanger plate of FIG. 14 showing the protrusions that run down the back of a T-post, and a depiction of how a T-post hanger plate engages the protrusions, securing the T-post hanger plate in place.

Referring to FIGS. 16-18, inserting the body 202 of the T-post 200 into the first mounting hole 152 allows the flange 206 to pass through the first elongated aperture 108 and the web 204 to pass through the aperture 160 into the second mounting hole 154 whereby the hanging member 104 extends outward from the body 202 in the direction of the web 204. When the first elongated aperture 108 is positioned between protrusions 301, orientating the second end 164 at a lower elevation than the first end 162 moves the notch 106 closer to the flange 206 decreasing the distance between the notch 106 and flange 206 and preventing passage of the protrusions 301 through the notch 106. Accordingly, the hanger plate 150 is held in place on the T-post 200 and prevented from moving down on the body 202 due to the protrusions 301 contacting the bottom or underside of the body 112. As with hanger plate 100, a target 350 can be hung from the hanging member 104.

Alternatively, inserting the body 202 of the T-post 200 into the second mounting hole 154 allows the hanging member 104 to extend outward from the body 202 in a direction opposite of the web 204, thereby allowing the hanger plate 150 to be used on the opposite side of the T-Post 200. The flange 206 is passed through the third elongated aperture 114 and the web 204 is passed through the aperture 160 into the first mounting hole 152. When the first elongated aperture 108 is positioned between protrusions 301, orientating the second end 164 at a lower elevation than the first end 162 moves the second notch 107 closer to the flange 206 decreasing the distance between the second notch 107 and flange 206 and preventing passage of the protrusions 301 through the second notch 107. Accordingly, the hanger plate 150 is held in place on the T-post 200 and prevented from moving down on the body 202 due to the protrusions 301 contacting the bottom or underside of the body 112. As with hanger plate 100, a target 350 can be hung from the hanging member 104.

The hanging member of the various embodiments include features that engage another object, such features include a post, protrusion, peg, hook, pulley, etc.

As required, detailed aspects of the present disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims, and as a representative basis for teaching one skilled in the art to variously employ the present disclosed subject matter in virtually any appropriately detailed structure.

The many features and advantages of the disclosed subject matter are apparent from the detailed specification. Further, since numerous modifications and variations will readily occur to those skilled in the art, it is not desired to limit the disclosed subject matter to the exact construction and operation illustrated and described. Accordingly, all suitable modifications and equivalents may be resorted to, and all fall within the scope of the disclosed subject matter.

Having thus described the disclosed subject matter, what is claimed as new and desired to be secured by Letters Patent is:

1. An apparatus for use with a T-post, comprising:
a body extending between a first end and a second end;
an opening passing through the body and configured to engage the T-post, the opening comprising:
  a first elongated aperture;
  a second elongated aperture extending from the first elongated aperture towards the body second end;
  wherein the first elongated aperture intersects the second elongated aperture at a location adjacent the body first end;
  a notch formed by the first elongated aperture, the notch disposed adjacent the intersection of the first and second elongated apertures, and the notch extending toward the body first end; and
a hanging member formed at the body second end, comprising:
  a smooth inner surface;
  an outer surface forming a plurality of facets, wherein the intersection of each facet forms a junction;
  a first cross-sectional dimension extending between the inner surface and the outer surface, the first cross-sectional dimension located at a midpoint between each junction;
  a second cross-sectional dimension extending between the inner surface and the outer surface, the second cross-sectional dimension located at each junction; and
  wherein the second cross-sectional dimension is greater than the first cross-sectional dimension.

2. The apparatus of claim 1, further comprising:
a target forming a mounting hole;
wherein the mounting hole forms an aperture with a diameter greater than the second cross-sectional dimension; and
wherein the hanging member is received by the mounting hole.

3. An apparatus for use with a T-post, comprising:
a body extending between a first end and a second end;
a first mounting hole, comprising:
  a first elongated aperture passing through the body;
  a second elongated aperture passing through the body, the second elongated aperture extending from the first elongated aperture towards the body second end;
  wherein the first elongated aperture intersects the second elongated aperture at a location adjacent the body first end; and
  a first notch formed by the first elongated aperture, the first notch disposed adjacent the intersection of the first and second elongated apertures, and the first notch extending toward the body first end;
a second mounting hole, comprising:
  a third elongated aperture passing through the body;
  wherein the third elongated aperture intersects the second elongated aperture at a location closer to the body second end than the body first end; and
  a second notch formed by the third elongated aperture, the second notch disposed adjacent the intersection of the second and third elongated apertures, and the second notch extending toward the body second end;
  wherein the first and second mounting holes are configured to engage the T-post; and
a hanging member formed at the body second end, comprising:
  a smooth inner surface;
  an outer surface forming a plurality of facets, wherein the intersection of each facet forms a junction;
  a first cross-sectional dimension extending between the inner surface and the outer surface, the first cross-sectional dimension located at a midpoint between each junction;
  a second cross-sectional dimension extending between the inner surface and the outer surface, the second cross-sectional dimension located at each junction; and
  wherein the second cross-sectional dimension is greater than the first cross-sectional dimension.

4. The apparatus of claim 3, further comprising:
a target forming a mounting hole;
wherein the mounting hole forms an aperture with a diameter greater than the second cross-sectional dimension; and wherein the hanging member is received by the mounting hole.

5. An apparatus for use with a T-post, comprising:
a body extending between a first end and a second end;
a first mounting hole, comprising:
  a first elongated aperture passing through the body;
  a second elongated aperture passing through the body, the second elongated aperture extending from the first elongated aperture towards the body second end;
  wherein the first elongated aperture intersects the second elongated aperture at a location adjacent the body first end; and
  a first notch formed by the first elongated aperture, the first notch disposed adjacent the intersection of the first and second elongated apertures, and the first notch extending toward the body first end;
a second mounting hole, comprising:
  a third elongated aperture passing through the body;
  wherein the third elongated aperture intersects the second elongated aperture at a location closer to the body second end than the body first end; and
  a second notch formed by the third elongated aperture, the second notch disposed adjacent the intersection of the second and third elongated apertures, and the second notch extending toward the body second end;
  wherein the first and second mounting holes are configured to engage the T-post;
a hanging member formed at the body second end, comprising:
  a smooth inner surface;
  an outer surface forming a plurality of facets, wherein the intersection of each facet forms a junction;
  a first cross-sectional dimension extending between the inner surface and the outer surface, the first cross-sectional dimension located at a midpoint between each junction;
  a second cross-sectional dimension extending between the inner surface and the outer surface, the second cross-sectional dimension located at each junction; and
  wherein the second cross-sectional dimension is greater than the first cross-sectional dimension;
a target forming a mounting hole; and
wherein the hanging member is received by the mounting hole.

6. An apparatus for use with a T-post, comprising:
a body extending between a first end and a second end;
a first mounting hole, comprising:
  a first elongated aperture passing through the body;
  a second elongated aperture passing through the body, the second elongated aperture extending from the first elongated aperture towards the body second end;
  wherein the first elongated aperture intersects the second elongated aperture at a location adjacent the body first end; and
  a first notch formed by the first elongated aperture, the first notch disposed adjacent the intersection of the first and second elongated apertures, and the first notch extending toward the body first end; and
a second mounting hole, comprising:
  a third elongated aperture passing through the body;
  wherein the third elongated aperture intersects the second elongated aperture at a location closer to the body second end than the body first end; and
  a second notch formed by the third elongated aperture, the second notch disposed adjacent the intersection of the second and third elongated apertures, and the second notch extending toward the body second end;
  wherein the first and second mounting holes are configured to engage the T-post;
a hanging member formed at the body second end, the hanging member comprising:
  a smooth inner surface;
  an outer surface forming a plurality of facets, wherein the intersection of each facet forms a junction;
  a first cross-sectional dimension extending between the inner surface and the outer surface, the first cross-sectional dimension located at a midpoint between each junction;
  a second cross-sectional dimension extending between the inner surface and the outer surface, the second cross-sectional dimension located at each junction; and
  wherein the second cross-sectional dimension is greater than the first cross-sectional dimension;
a target forming a mounting hole, wherein the mounting hole forms an aperture with a diameter greater than the second cross-sectional dimension; and
wherein the hanging member is received by the mounting hole.

7. The apparatus of claim 6, wherein:
the first notch is a C-curve; and
the second notch is a C-curve.

\* \* \* \* \*